United States Patent [19]
Kempf

[11] Patent Number: 5,947,227
[45] Date of Patent: Sep. 7, 1999

[54] DEVICE FOR MANUAL GAS FEED IN MOTOR VEHICLES

[76] Inventor: Martine Kempf, 1245 Lakeside Dr. #3005, Sunnyvale, Calif. 94086

[21] Appl. No.: 08/886,508

[22] Filed: Jul. 1, 1997

[30] Foreign Application Priority Data

Jul. 2, 1996 [DE] Germany .......................... 196 26 625

[51] Int. Cl.⁶ .................................. B60K 26/02
[52] U.S. Cl. ........................... 180/335; 280/731
[58] Field of Search .............................. 180/335; 280/731

[56] References Cited

U.S. PATENT DOCUMENTS

| 1,593,876 | 7/1926 | Learmont | 180/335 |
| 2,228,393 | 1/1941 | Leaming | 180/335 |
| 5,383,682 | 1/1995 | Nagata et al. | 280/731 |

FOREIGN PATENT DOCUMENTS

| 69090 | 1/1983 | European Pat. Off. | 180/335 |
| 0 634 301 A1 | 1/1995 | European Pat. Off. | |
| 0 647 540 A1 | 4/1995 | European Pat. Off. | |
| 1 135 356 | 4/1957 | France | |
| 2597038 | 10/1987 | France | 180/335 |

*Primary Examiner*—Kenneth R. Rice
*Attorney, Agent, or Firm*—Jacobson, Price, Holman & Stern, PLLC

[57] ABSTRACT

The invention concerns a device for the manual feeding of gas in motor vehicles with a gas hand ring (3) that is movable against the force of an energy accumulator, which activates an actuating mechanism (11, 11', 69, 71, 73). A mechanism (15, 17, 19, 29) is provided between the gas hand ring (3) and the actuating mechanism (11, 11', 69, 71, 73), which is arranged in a space between an airbag (9) of the motor vehicle and a hub part (5) of the steering wheel (1). The gas hand ring (3) has a ring part (13) affixed to the mechanism (15, 17, 19, 29).

26 Claims, 3 Drawing Sheets

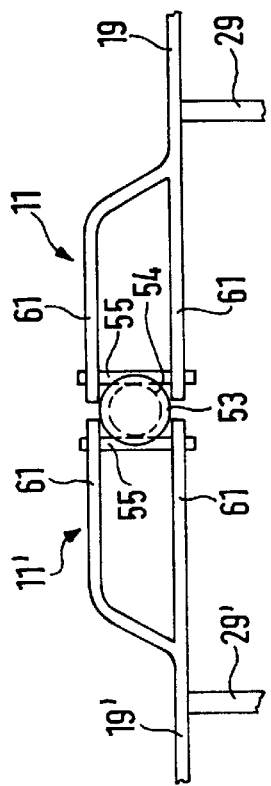
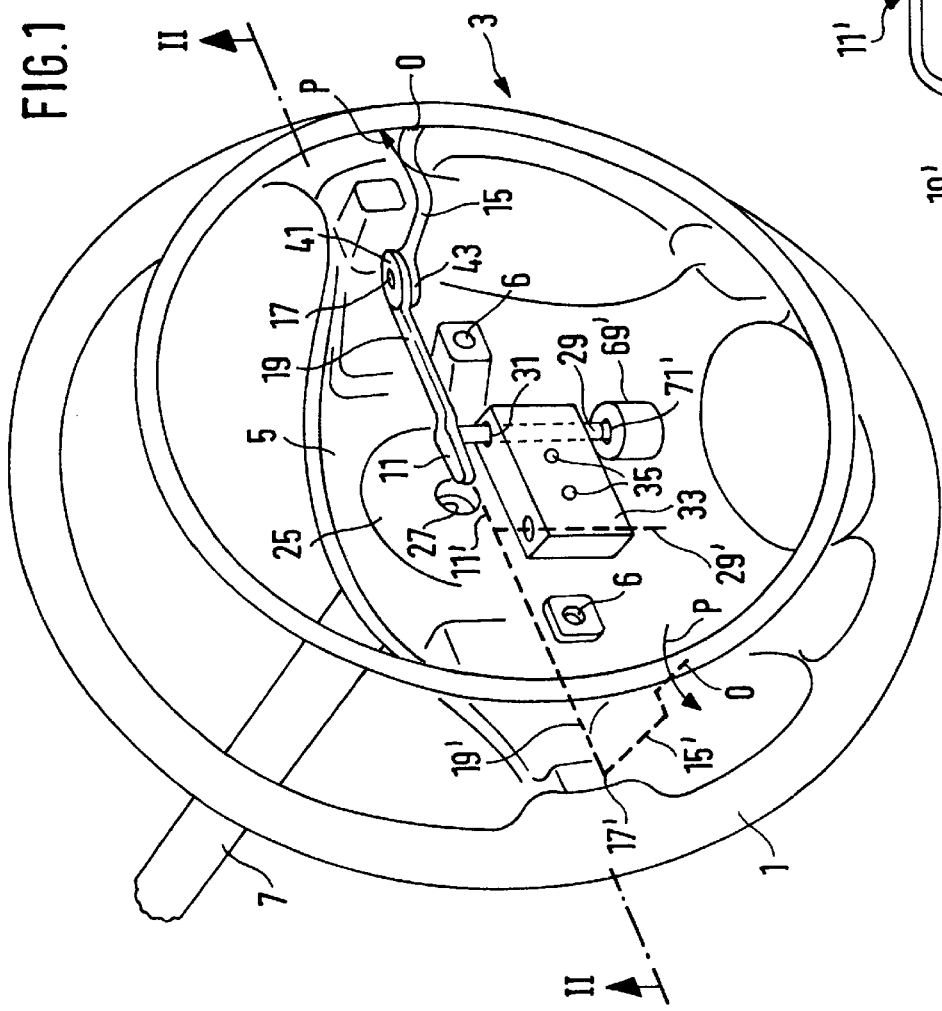

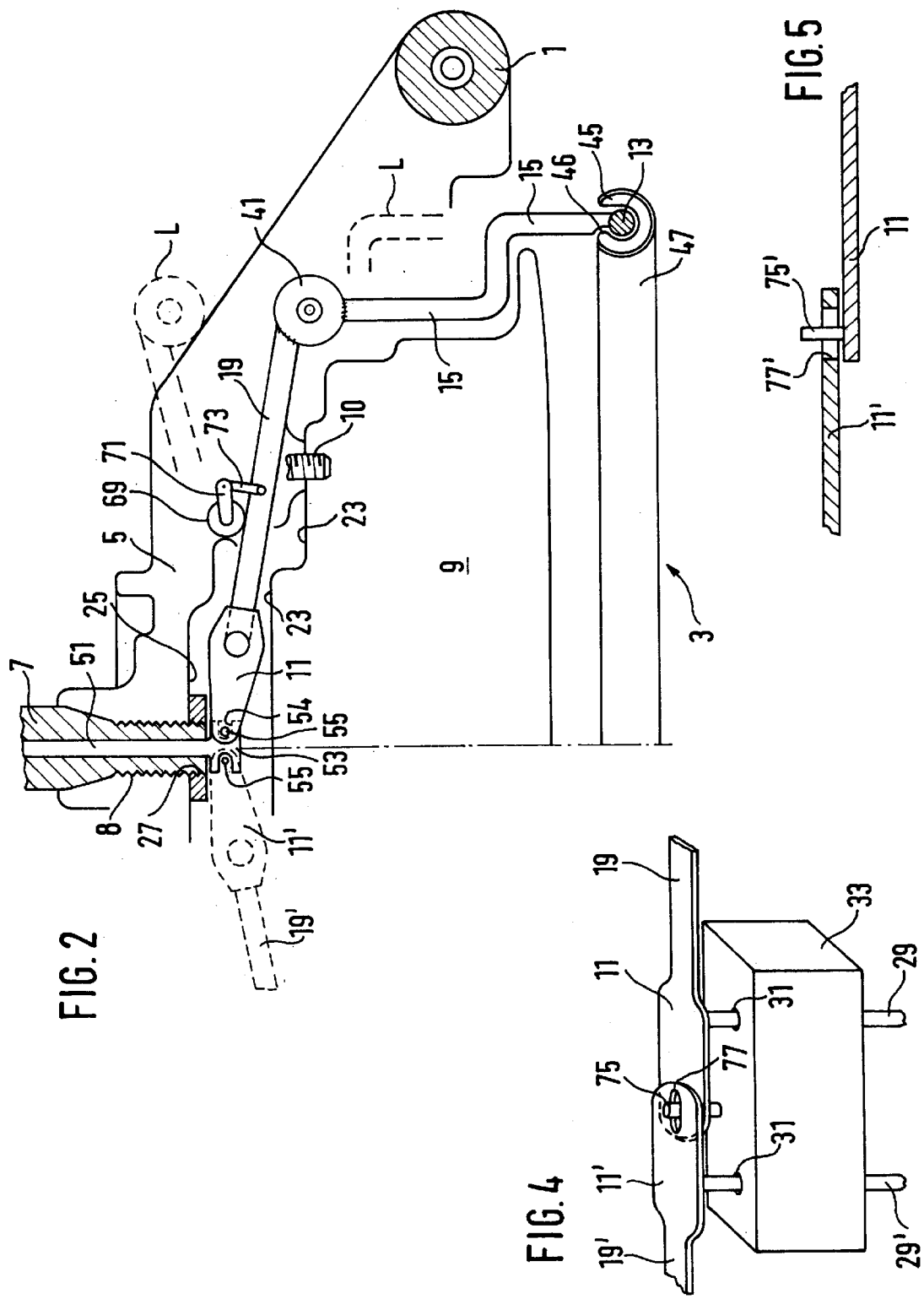

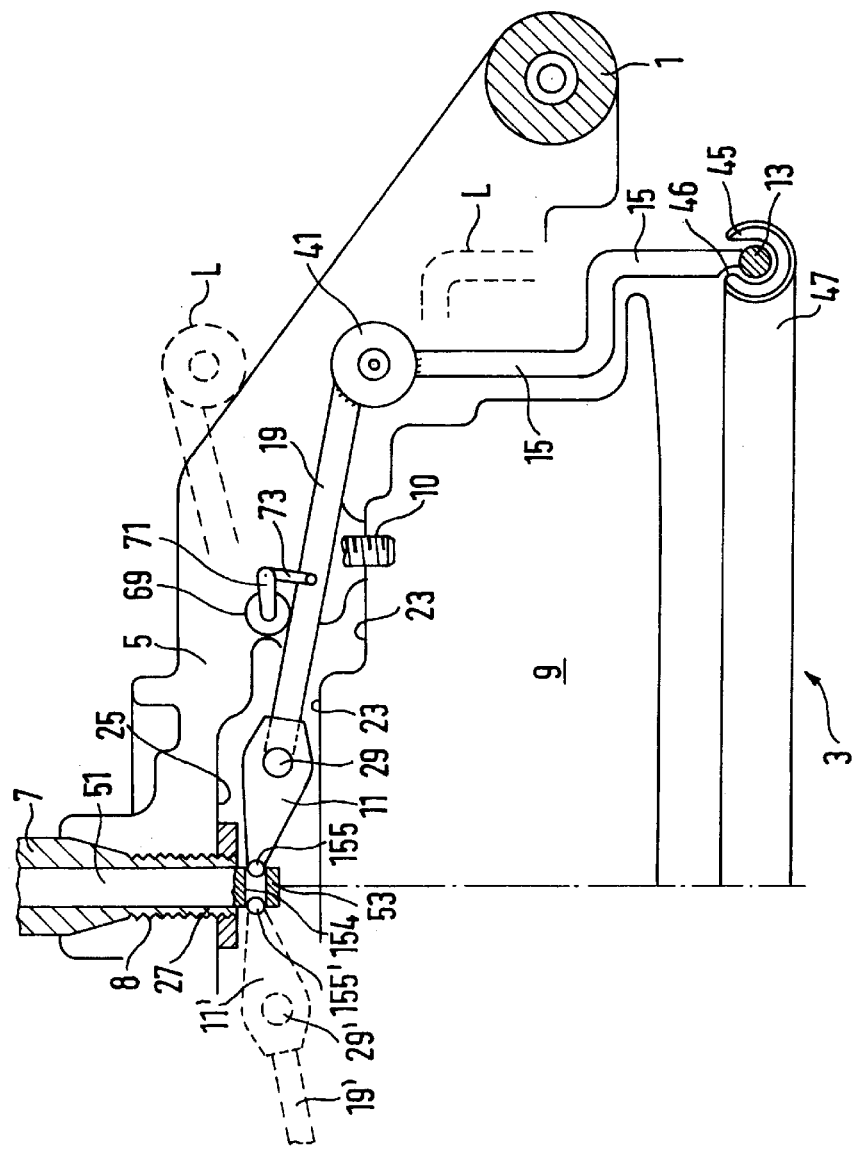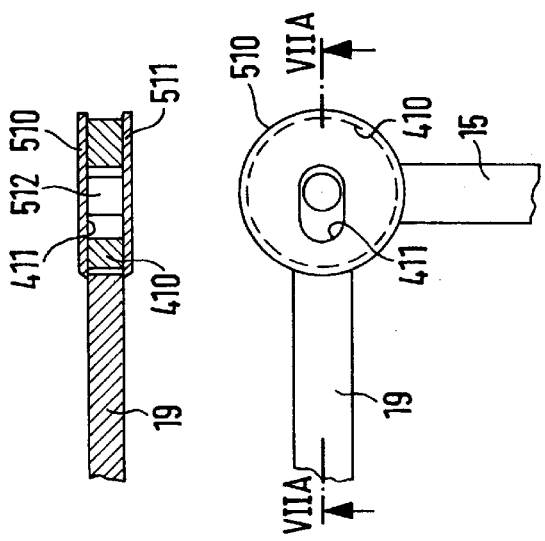

DEVICE FOR MANUAL GAS FEED IN MOTOR VEHICLES

The invention concerns a device for the manual feeding of gas in motor vehicles according to the introductory clause of Patent claim 1.

Such a device is outlined in the French patent document 1 135 356, which has the form of a gas hand ring which is concentrically arranged with respect to the steering wheel of a motor vehicle, whereby the gas hand ring is axially connected in the center to a rod, which runs through the hollow steering column. The rod is thus mounted so that the gas hand ring can turn in relation to the steering wheel. In order to feed gas, the gas hand ring is pressed against an energy accumulator from the zero or idle position, downward, in the direction of the hub part of the steering wheel, whereby the stroke of the rod moves the gas pedal through an associated action. With the release of the gas control ring, the energy accumulator returns this back to the zero position.

A considerable advantage of the known gas hand ring is that it can be turned independent of the steering wheel. This makes it possible that the gas hand ring can be held stationary and the steering wheel can be released, if the vehicle, for example, is driving out from a tight curve, whereby the steering wheel alone goes back into the original position and then can be grasped again. With a normal ride, for example on the highway, both hands remain on the steering wheel and at the same time on the depressed gas hand ring. The described known gas hand ring is particularly well suited also for motor sports (i.e. hill climbing, etc.).

The known gas hand ring described here cannot be used with today's vehicles in which an airbag is centrally arranged in the space surrounding the steering wheel.

A device was proposed for vehicles equipped with an airbag in the steering wheel, in which a series of small touch levers are arranged concentric to the steering wheel, which permit a view toward the instrument panels or displays in the zero position of the steering wheel, because the touch levers are arranged in the shape of a "U" along a reference arc. With the movement of a touch lever the reference arc that is fastened to the steering wheel, which turns together with the steering wheel and surrounds the airbag, is pressed down by a tilting motion. The pressure is transferred to a potentiometer for the generation of an electrical signal. Based on the generated electrical signal the gas pedal is moved. A problem of this known device consists of the fact that the touch levers are not arranged around the entire inner diameter of the steering wheel, so minimally with the steering wheel in the normal position the view of the instrument panels or displays is permitted. For this reason the utility of a touch lever is decreased to a range which is considerably less than 360°. During turning, the touch levers are at least partially turned so that they cover the displays. Since the reference circle carrying the touch levers cannot freely turn in relation to the steering wheel, the advantages described in connection with FR-PS 1 135 356 cannot be achieved during turning. A further problem consists in that the touch levers, which are in the form of aluminum parts, are relatively large and bulky, so that they do not give way in the case of an accident. Injuries, especially in the head area, are therefore a concern.

The task of the present invention consists of improving a device of the type cited in the preceding introduction so that it is usable in motor vehicles which have an airbag in the area surrounding the steering wheel, whereby, at the same time, the advantages realizable by a free rotation of the known gas hand ring with respect to steering are achievable.

This problem is solved by a device with the characteristics of the present invention.

The important advantage consists in that the gas hand ring of the device according to the invention in relation to the steering wheel can be freely rotated, so that the vehicle can be steered especially well. In particular the vehicle can be steered well coming out of tight curves. A vehicle equipped with the proposed device can therefore be used by disabled individuals and also for racing, for example for hill climbs. Alongside the advantages for steering, a further advantage consists in that the gas hand ring of the device according to the invention is closed and therefore can be used from all sides. Conveniently, the proposed device is formed so that it can be integrated into the existing space between an air bag and a steering wheel without any further measures, whereby a sufficiently large travel in the actuating mechanism is achievable. Therefore the actuating mechanism can be arranged in the space between the hub part of the steering wheel in the area of the steering column and the base of the air bag, which in the worst case amounts to around only 15 mm. With the device according to the invention, an important advantage consists in that, in case of an accident, the entire ring part parallel to the steering column is thrust inward, whereby the entire linkage mechanism is arranged within the steering wheel in the room between the airbag and the hub part of the steering wheel. The ring part bends in a collision, whereby the protective cover part of the ring part creates a cushioning effect. Injuries from protruding parts and parts that do not bend back are therefore not to be feared. In a collision, the whole device disappears behind the plane of the steering wheel rim. A further advantage consists in that the device according to the invention is simply constructed and can also be easily retrofitted into existing vehicles. Conveniently, a mechanism for the regulation of the gas pedal and/or an electrical potentiometer, for example a linear potentiometer, for the generation of a regulating signal can be actuated with the actuating device according to the invention. The gas hand ring of the device according to the invention is constituted so that it covers the vehicle instrumentation as little as possible.

The invention and its model versions are explained in greater detail below together with the Figures. They show:

FIG. 1 in perspective view, a design form of a device according to the invention, which is built into the interior space surrounding a steering wheel, in which the airbag situated in this interior space is not shown;

FIG. 2 a section through the configuration of FIG. 1 along the line II—II, whereby the airbag is shown; and FIGS. 3–6 design versions of the configurations of actuating mechanisms and FIG. 7A, B an additional design version of the connection between the first and second rod part.

In FIG. 1 the steering wheel of a motor vehicle is marked 1. The steering wheel is attached to a hub part 5, which, in turn, is mounted to a steering column 7, schematically represented in FIG. 1. An airbag 9 is found in the interior space surrounded by the steering wheel 1 and the hub part 5 according to FIG. 2.

According to FIG. 1, the present invention, in its essentials, has a gas hand ring 3, a connecting rod linkage and an actuating mechanism 11. The connecting rod linkage includes a first connecting rod part 15 connected with a ring part 13 of the gas hand ring 3, which, beginning with the gas hand ring 3, or rather from the ring part 13, runs beside the airbag through the intermediate space formed between the hub part 5 and the airbag 9 through to the steering column 7. The first connecting rod part 15 can be bent to suit the intermediate space. The free end of the first connecting rod part 15 can be swung about a fulcrum point 17 in relation to the one end of a second connecting rod part 19 which, beginning with the fulcrum point 17, runs into the space 21 which exists between the base 23 of the airbag 9 and the area 25 of the hub part 5 surrounding the steering column 7. In existing steering wheel configurations, this space 21 has a dimension in the direction of the axis of the steering column 7 which is on the order of at least 15 mm. In the manner visible through FIG. 2, the hub part 5 is screwed onto an outer threading 8 of the steering column 7. The airbag 9, with the help of attachment screws 10, is screwed into bores 6, which are found in the projections 12 of the hub part, which render the said dimension between the base 23 of the airbag 9 and the area 25 bordering the steering column 7.

The free end of the second connecting rod part 19 forms the actuating mechanism 11 which projects into the area of an opening 27, that is found in the hub part 5 and makes possible an entrance into the interior of the steering column 7. In the area of the actuating mechanism 11, the second connecting rod part 19 is mounted to a post part 29 in a bore 31 of a retaining block 33, which is connected at the area 25 of the hub part 5. For this purpose, bores 35 are found in the retaining block 33, through which attachment screws (not shown) run, which are screwed onto area 25. The post part 29 extends perpendicular to the longitudinal axis of the second connecting rod part 19. While in FIG. 1 only the connecting rod linkage having the first connecting rod part 15, the second connecting rod part 19, the actuating mechanism 11 and the post part 29 are shown, at the ring part 13 opposite may be a second connecting rod linkage which consists of a third connecting rod part 15', that corresponds to the connecting rod part 15, a fourth connecting rod part 19', that corresponds to the second connecting rod part 19, and an actuating mechanism 11' that likewise projects into the opening 27 and corresponds to the actuating mechanism 11. The fourth connecting rod part 19' is mounted with the help of post part 29' inserted into a bore 31 in the retaining block 33, which corresponds to the post part 29. The third connecting rod part 15' and the fourth connecting rod part 19' are swivel mounted about a fulcrum point 17'. Preferably, the fulcrum points 17 and 17' are formed so that at the corresponding ends of the connecting rod parts 15, 15' and 19, 19' a flange 41 and 43, respectively, is situated, that each has a bore 44 oriented toward the other through which a pin forming the fulcrum points 17, 17' is inserted.

A ring-shaped shell part 45 which is movable around the perimeter of the ring part 13 is placed on the ring part 13 affixed to the connecting rod parts 15, 15', that conveniently has a ring-shaped slot 46 on its side facing the connecting rod parts 15 and 15', through which the said connecting rod parts 15, 15' run to the outside. Conveniently, the shell part 45, which is made out of plastic material, is covered with a cushioning ring-shaped protective cover part 47.

With the movement of the gas hand ring 3 from the idle position to the full gas position, in other words if the same is pressed in the direction of the steering column by the application of force, the connecting rod parts 15, 15' and 19, 19' are moved in the manner illustrated in FIG. 2 by broken lines L in the intermediate space between the airbag 9 and the hub part 5, whereby the connecting rod parts 19, 19' turn around the fulcrum points 17, 17' and the post parts 29, 29' turn within the bores 31. Therefore the actuating mechanisms 11, 11' are turned about the fulcrum points formed by the post parts 29, 29' with their free ends moving away from the hub part 5. This movement is utilized for the actuation of the gas pedal in a mechanical and/or electrical manner.

With the movement of the gas hand ring 3 in the direction of the steering wheel 1 it is of significance that the gas hand ring 3 is elastic enough that it permits an elastic deformation making possible the turning of the connecting rod parts 15, 19, and 15', 19' about the axis of the post part 29, 29'. Put more precisely, with this movement, the gas hand ring is elastically turned up to the maximum outward movement of the fulcrum point 17, 17' around the place of attachment O of the connecting rod parts 15, 15' on the ring part 13 (arrow P in FIG. 1), so that the ring part 13 is bent out altogether out of its plane in the direction of the steering column 7.

With a mechanical actuation of the gas pedal, a control rod 51 is found in the interior of the steering column 7 in the manner visible through FIG. 2, which is axially moved by the actuating mechanism 11, 11'. For this purpose, the control rod has a head part 53 found in the space between the area 25 of the hub part 5 and the base 23 of the airbag 9, that has a perimeter groove 54, in which a pin 55 of the actuating mechanism 11, 11' is engaged. The control rod 51 is therefore pulled up for the actuation of the gas, when the gas hand ring 3 is pressed in the direction of the airbag.

Especially convenient, the actuating mechanism 11, 11' according to FIG. 3 has the form of a fork part, whereby the pins 55 are each attached in opposing areas of the fork part 61, 61, respectively, which hold the head part 53 between them.

When an electrical signal is to be generated with the help of a potentiometer 69 for the actuation of the gas, the regulating arm 71 of this potentiometer 69 is mechanically joined to an actuating mechanism 11 or 11' or to a connecting rod part 19, 19'. In FIG. 2 one such potentiometer 69 is illustrated, whose regulating arm 71 is joined to the connecting rod part 19 by a regulating rod 73. With the actuation of the gas hand ring 3, the connecting rod part 19 is swung into the position shown by the broken lines L, whereby the regulating arm 71 is turned for the generation of the electrical signal.

When the actuation of the gas is effected exclusively through the generation of an electrical signal, the control rod 51 with the head part 53 can be eliminated. In this case, the ends of the actuating mechanisms 11, 11' that face each other are connected to each other by a linkage pin 75. Therefore the linkage pin 75 is conducted through slots which are found in the actuating mechanism 11, 11'.

According to FIG. 5 the linkage pin 75' can also be attached to an actuating mechanism 11 and introduced into a slot 77' of the other actuating mechanism 11'. Especially helpful is a version, in which the post part 29 and/or 29' actuates a rotary potentiometer 69' (as shown in FIG. 1). For this purpose the end of the post part 29, 29' directly engages the turning axis 71' of the rotary potentiometer. A radial loading of the rotary potentiometer 69' is thereby prevented.

It is evident from this that in the place of the described mechanism, wherein the movement of the gas hand ring is transferred to the actuating mechanism, also other devices can be provided in the space between the airbag and the hub part.

According to FIG. 6, the control rod 51 at its end region or head part 53 in the place of the perimeter groove 54 (FIG. 2), has a transverse bore 154, in which a ball part 155, 155' is inserted from each side, which is attached onto the free end of the actuating mechanism 11 or 11'. The ball parts 155, 155' are advantageously formed by small steel balls, which conveniently possess a diameter of about 4 mm and are welded to the actuating mechanism 11. Details of FIG. 6, that were already explained in connection with the other Figures, are labeled in the corresponding manner.

In connection with FIGS. 7A and 7B, a design model version is now explained in which the hinge 41 between the first connecting rod part 15 and the second connecting rod part 19 is formed so that no loads are transferred from the second connecting rod part 19 to the first connecting rod part 15 and therefore to the ring part 13 which might be conducted back due to a rotation of the second connecting rod part about the fulcrum formed by the post part 29.

For this reason the first connecting rod part 15 has, on its end which faces the second connecting rod part, a flange 410, in which a slot 411 is provided. The second connecting rod part 19 has, on its end which faces the first connecting rod part 15, a fork part composed of an upper flange 510 and a lower flange 511 arranged congruently to it, between which the flange 410 of the first connecting rod part 15 is engaged. The flanges 510, 511 and 410 are therefore oriented parallel to one another. From the upper flange 510 to the lower flange 511 of the second connecting rod part 19 runs a pin 512 penetrating the slot of the flange 410, whereby the pin is conveniently attached to the upper flange 510 and the lower flange 511. Through this arrangement it is achieved that with a rotation of flange parts 510, 511 and the pin 512 about the post part 29, the pin 512 is moved in the slot 411, so that no force conducting back due to this rotation is transferred onto the first connecting rod part 15. In this way a deformation of the ring part 13 is prevented.

Conveniently the slot 411 runs along the longitudinal axis of the second connecting rod part 19, when the first and the second connecting rod parts extend perpendicular to one another. It is evident from this that the fork part can also be arranged on the first connecting rod part 15 and the flange 410 on the second connecting rod part 19. Also the slot can be assigned to the first connecting rod part 15 and the pin to the second connecting rod part 19.

I claim:

1. Device for the manual feeding of gas in motor vehicles with a gas hand ring (3) that is movable against the force of an energy accumulator, which acts on an actuating mechanism (11, 11', 69, 71, 73), characterized in that between the gas hand ring (3) and the actuating mechanism (11, 11', 69, 71, 73) a mechanism (15, 17, 19, 29) is provided, which is arranged in a space between an airbag (9) of the motor vehicle and a hub part (5) of the steering wheel (1), and that the gas hand ring (3) has a ring part which is affixed to the mechanism (15, 17, 19, 29).

2. Device according to claim 1, characterized in that the mechanism (15, 17, 19, 29) is a linkage mechanism comprising a first connecting rod part (15), which is connected on its one end to the ring part (13), a second connecting rod part (19), which is connected on its one end to the other end of the first connecting rod part (15) about a fulcrum point (17), and a post part (29), such that the post part (29) is connected to the end area of the other end of the second connecting rod part (19), extends perpendicular to the axis of the steering wheel (1) and is swivel mounted to the hub part (5) about its longitudinal axis.

3. Device according to claim 2, characterized in that the post part (29) is situated in a bore (31) of a retaining block (33) attached to the hub part (5).

4. Device according to claim 2 or 3, characterized in that an additional corresponding linkage mechanism (15', 17', 19', 29') with a first connecting rod part (15'), a second connecting rod part (19'), a fulcrum point (17') and a post part (29') is provided which is diametrically opposite the linkage mechanism (15, 17, 19, 29) on the gas hand ring (3).

5. Device according to claim 1 or 2, characterized in that a ring-shaped shell part (45) is arranged on the ring part (13) which is freely movable in a circumferential direction of the ring part (13).

6. Device according to claim 2, characterized in that the actuating mechanism (11) has the form of a part movable by the linkage mechanism and mechanically joined to a control rod (51), the control rod (51) being found in an interior of a steering column (7) of the steering wheel (1).

7. Device according to claim 6, characterized in that the part is connected to the other end of the second connecting rod part (19), and projects to the side facing the fulcrum point (17) through the post part (29) and is mechanically joined to a head part (53) which is connected to the control rod (51), the head part (53) being found in the space between the area (25) of the hub part (5) surrounding the steering column (7) and the base (23) of the airbag (9).

8. Device according to claim 7, characterized in that the head part (53) has a perimeter groove (54), into which a pin (55) connected to the actuating mechanism (11) protrudes.

9. Device according to claim 7, characterized in that the head part (53) has a transverse bore (154), into which a ball part (155) connected to the actuating mechanism (11) protrudes.

10. Device according to claim 8, characterized in that the actuating mechanism (11) has at its free end two parts (61, 61), that hold between them a lateral area of the head part (53), of a type that the pin (55) held between them protrudes into the perimeter groove (54) of the head part (53).

11. Device according to claim 2, characterized in that the actuating mechanism comprises an electric potentiometer (69), joined to the movement of the linkage mechanism, for the generation of an electrical regulating signal for activating the gas pedal.

12. Device according to claim 11, characterized in that actuating mechanism further comprises a regulating arm (71) of the potentiometer (69) which is connected with one of the second connecting rod part (19) and the actuating mechanism (11, 11') of the linkage mechanism.

13. Device according to claim 4, characterized in that the actuating mechanisms (11, 11') of the linkage mechanism (15, 17, 19, 29) and of the additional linkage mechanism (15', 17', 19', 29') are mechanically joined to one another.

14. Device according to claim 13, characterized in that the actuating mechanisms (11, 11') overlap and each has a slot (77), and that a linkage pin (75) is conducted through the slots (77) which are congruently arranged with respect to one another.

15. Device according to claim 13, characterized in that the actuating mechanisms (11, 11') overlap and that a linkage pin (75') is attached to an actuating mechanism (11) and protrudes into a slot (77') of the other actuating mechanism (11').

16. Device according to claim 5, characterized in that the shell part (45) extends over more than 180° of the perimeter of the ring part (13) and has a slot running in the direction of the perimeter, through which the first connecting rod part runs.

17. Device according to claim 16, characterized in that the slot (46) is arranged on the side of the shell part (45) facing the steering wheel (1).

18. Device according to claim 5, characterized in that the shell part (45) is provided with a covering part (47).

19. Device according to claim 18, characterized in that the covering part (47) is a cushioning part.

20. Device according to claim 1 or 2, characterized in that the ring part (13) is made of steel.

21. Device according to claim 2, characterized in that the first connecting rod part (15) is bent so that it is adapted to the space between the airbag (9) and the hub part (5).

22. Device according to claim 11, characterized in that the potentiometer is a rotary potentiometer (69'), whose turning axis (71') is directly engaged with the free end of the post part (29).

23. Device according to claim 2, characterized in that the fulcrum point (17) is formed by a first flange part (410), that is attached to the end of the first connecting rod part (15) facing the second connecting o rod part (19), that the first flange part (410) has a slot (411), through which runs a pin (512) that is attached to at least one of a second and a third flange part (510, 511) that are set apart from each other attached to the end of the second connecting rod part (19) facing the first connecting rod part (15), that the first flange part is mounted between the second and third flange parts, whereby the pin (512) can slide about the axis of the post part (29) in the slot (411) with a rotation of the second connecting rod part (19), in order to prevent a transfer of force from the second to the first connecting rod part.

24. Device according to claim 2, characterized in that the fulcrum point (17) is formed by a first flange part, that is attached to the end of the second connecting rod part facing the first connecting rod part, that the first flange part has a slot, through which runs a pin that is attached to at least one of a second and a third flange part, that are set apart from each other and attached to the end of the first connecting rod part (19) facing the second connecting rod part (15), that the first flange part is mounted between the second and third flange parts, whereby the pin (512) can slide about the axis of the post part (29) in the slot (411) with a rotation of the second connecting rod part (19), in order to prevent a transfer of force from the second to the first connecting rod part.

25. Device according to claim 23 or 24, characterized in that the slot runs parallel to the longitudinal axis of the second connecting rod part.

26. Device according to claim 23 or 24, characterized in that the first and second connecting rod parts run perpendicular to one another.

* * * * *